US012368952B2

(12) United States Patent
Liu et al.

(10) Patent No.: US 12,368,952 B2
(45) Date of Patent: Jul. 22, 2025

(54) AUTO FOCUS (AF) METHOD AND SYSTEM FOR ELECTRO-HYDRAULIC (EH) LENS WITH ADJUSTABLE FOCUS, AND AN ELECTRONIC DEVICE

(71) Applicants: Jining University, Shandong Province (CN); Shanghai University, Shanghai (CN)

(72) Inventors: Jun Liu, Shandong Province (CN); Hengyu Li, Shanghai (CN); Yunyun Jiang, Shanghai (CN); Jingyi Liu, Shanghai (CN); Yueying Wang, Shanghai (CN); Shaorong Xie, Shanghai (CN); Jun Luo, Shanghai (CN)

(73) Assignees: Jining University, Qufu (CN); Shanghai University, Shanghai (CN)

( * ) Notice: Subject to any disclaimer, the term of this patent is extended or adjusted under 35 U.S.C. 154(b) by 100 days.

(21) Appl. No.: 18/534,020

(22) Filed: Dec. 8, 2023

(65) Prior Publication Data
US 2025/0080842 A1 Mar. 6, 2025

(30) Foreign Application Priority Data
Aug. 28, 2023 (CN) .......................... 202311094832.X

(51) Int. Cl.
*H04N 23/67* (2023.01)
*G02B 3/14* (2006.01)
(Continued)

(52) U.S. Cl.
CPC ............. *H04N 23/673* (2023.01); *G02B 3/14* (2013.01); *G06V 10/22* (2022.01); *G06V 10/25* (2022.01);
(Continued)

(58) Field of Classification Search
None
See application file for complete search history.

(56) References Cited

U.S. PATENT DOCUMENTS 11,179,028 B2 * 11/2021 Tearney ................. A61B 1/041
2008/0097143 A1 * 4/2008 Califorrniaa ......... A61B 17/435
600/22
(Continued)

FOREIGN PATENT DOCUMENTS

CN 113538545 A * 10/2021 ........... H04N 23/675
CN 113838150 A * 12/2021 ............... G02B 3/14
(Continued)

OTHER PUBLICATIONS

Li et al.; CN 119136052A; Focus Adjusting Method, Device, Equipment and Medium of Electro-hydraulic Adjustable Focus Lens; Dec. 13, 2024;English Translation (Year: 2024).*
(Continued)

Primary Examiner — Cynthia Segura
(74) Attorney, Agent, or Firm — Lippes Mathias LLP

(57) ABSTRACT

The present disclosure provides an auto focus (AF) method and system for an electro-hydraulic (EH) lens with an adjustable focus, and an electronic device, and relates to the field of lens focusing technologies. The method mainly includes: determining a state space, an action space, and a reward function of a reinforcement learning (RL) method; constructing sample data based on the foregoing determined state space, action space, and reward function, and storing the sample data in an experience pool; and using sample data in the experience pool as training data of a deep neural network (DNN) architecture when there are M sets of the sample data in the experience pool, and obtaining a trained
(Continued)

AF policy with reference to a deep deterministic policy gradient (DDPG) algorithm and a single hill climbing optimization (HCO) algorithm.

13 Claims, 7 Drawing Sheets

(51) Int. Cl.
  *G06V 10/22* (2022.01)
  *G06V 10/25* (2022.01)
  *G06V 10/82* (2022.01)
  *H04N 23/617* (2023.01)

(52) U.S. Cl.
  CPC ............ *G06V 10/82* (2022.01); *H04N 23/617* (2023.01); *G06V 2201/07* (2022.01)

(56) References Cited

U.S. PATENT DOCUMENTS

| | | | | |
|---|---|---|---|---|
| 2009/0281389 | A1* | 11/2009 | Iddan | A61B 1/04 600/167 |
| 2012/0275030 | A1* | 11/2012 | Kong | G02B 3/14 359/665 |
| 2020/0297572 | A1* | 9/2020 | Aschwanden | G02B 3/14 |
| 2023/0071743 | A1* | 3/2023 | Li | E21B 43/26 |

FOREIGN PATENT DOCUMENTS

| | | | | |
|---|---|---|---|---|
| CN | 119136052 | A | * 12/2024 | ........... H04N 23/675 |
| JP | 2009251420 | A | * 10/2009 | ............... G02B 3/14 |

OTHER PUBLICATIONS

Li et al.; CN 113538545A; A Monocular Depth Estimation Method Based on Electro-hydraulic Adjustable Focus Lens and Corresponding Camera and Storage Medium; Oct. 22, 2021; English Translation (Year: 2021).*

Li et al.; CN 113838150A; A Moving Target Three-dimensional Track Tracking Method Based on Electro-Hydraulic Adjustable Focus Lens; Dec. 24, 2021; English Translation (Year: 2021).*

Yokoyama et al.; JP 2009-251420A; Variable Focus Lens Device; Oct. 29, 2009; English Translation (Year: 2009).*

* cited by examiner

AUTO FOCUS (AF) METHOD AND SYSTEM FOR ELECTRO-HYDRAULIC (EH) LENS WITH ADJUSTABLE FOCUS, AND AN ELECTRONIC DEVICE

CROSS REFERENCE TO RELATED APPLICATION

This patent application claims the benefit and priority of Chinese Patent Application No. 202311094832X, filed with the China National Intellectual Property Administration on Aug. 28, 2023, the disclosure of which is incorporated by reference herein in its entirety as part of the present application.

TECHNICAL FIELD

The present disclosure relates to the field of lens focusing technologies, and in particular, to an auto focus (AF) method and system for an electro-hydraulic (EH) lens with an adjustable focus, and an electronic device.

BACKGROUND

For current image and visual applications, an AF technology is crucial in obtaining a clear image with high quality. However, a conventional AF method is usually based on a rule or a fixed algorithm. With continuous development of electronic technologies and automation technologies, it is difficult to adapt to a complex and variable environment, especially when there is a moving target, a background is blurred, and so on.

As an advanced optical device, an EH lens with an adjustable focus is widely used in fields such as a camera, an unmanned aerial vehicle (UAV), and a smartphone, to implement real-time and accurate auto-focusing. A conventional zoom lens implements zooming by adjusting a distance between two prime lenses. Different from the conventional zoom lens, the EH lens with an adjustable focus adjusts a pressure of a liquid by changing an electric field to adjust a focal length. As shown in relevant test data, energy consumed in each zoom process is only 0.1 mJ, and zoom time required to change from a most extreme convex surface to a concave surface is only a few milliseconds. FIG. 1 is a schematic diagram of a relationship between focal power and a drive current of a classical EH lens with an adjustable focus.

To resolve the foregoing AF problem, a reinforcement learning (RL) method is gradually applied to the AF field in recent years. The RL method is a machine learning method that can obtain feedback from an environment and progressively optimize a decision according to the feedback. In an AF problem of the EH lens with an adjustable focus, the RL method can enable a system to independently adjust a focal length according to different environment conditions and target characteristics, to obtain a clearer and sharper image.

However, in actual application, an RL method-based AF method for the EH lens with an adjustable focus still faces some challenges, including:

Dynamic environment change: A change in an environment condition and a moving target may result in failure of an AF policy. How to maintain stable and effective AF performance in a dynamic environment is a problem that needs to be resolved.

Reward design: The RL method relies on a reward signal to optimize a policy. How to design an appropriate reward function to accurately evaluate definition and quality of an image is a key challenge.

Real-time requirement: In many application scenarios, auto-focusing needs to be performed while meeting the real-time requirement. How to maintain high real-time performance while ensuring focusing quality is an issue that needs to be considered.

SUMMARY

The present disclosure aims to provide an AF method and system for an EH lens with an adjustable focus, and an electronic device, to resolve the foregoing problem.

To achieve the above objective, the present disclosure provides the following technical solutions.

According to a first aspect, an AF method for an EH lens with an adjustable focus includes:

determining a state space, an action space, and a reward function of an RL method, where the state space includes at least two parameters, respectively being image definition and a camera focal length: the action space includes one parameter, being a focusing current value of the EH lens with an adjustable focus; and the reward function is a function designed according to an image difference before and after an action;

obtaining a target image acquired by an image sensor, automatically selecting a focusing target area from the target image by using a computer vision technology, and calculating image definition and a camera focal length of the focusing target area;

inputting a current state into a policy network in a deep neural network (DNN) architecture to obtain a current initial action, adding noise to the current initial action to obtain a current composite action, and determining a next state according to the current composite action, where the current state refers to image definition and a camera focal length of a current focusing target area: the current initial action refers to a current focusing current value; and the next state refers to image definition and a camera focal length of a next focusing target area;

calculating a current reward according to the current state, the next state, the current composite action, and the reward function, and storing the current state, the next state, the current composite action, and the current reward as a set of sample data in an experience pool;

using sample data in the experience pool as training data of the DNN architecture when there are M sets of the sample data in the experience pool, and obtaining a trained AF policy with reference to a deep deterministic policy gradient (DDPG) algorithm and a single hill climbing optimization (HCO) algorithm; and deploying the trained AF policy to a to-be-focused EH lens with an adjustable focus, so that the to-be-focused EH lens with an adjustable focus is capable of automatically adjusting a focal point in a real-time environment.

Optionally, the state space further includes image contrast and edge definition.

Optionally, the reward function is:

$$r(s_t, a_t, s'_t)_t = \omega_1 \Delta d_c(s_t, s'_t) \times (\Delta d_d(s_t, s'_t) + \Delta d_e(s_t, s'_t)) +$$
$$\omega_2 \Delta d_d(s_t, s'_t) + \omega_3 \Delta d_e(s_t, s'_t) + \omega_4 \Delta f(a_t) \times (\Delta d_d(s_t, s'_t) + \Delta d_e(s_t, s'_t)),$$

where $r_t$ is a reward value: $\Delta d_c(s_t,s_t')$ is a change value of image contrast of a next state $s_t'$ relative to image contrast of a current state $s_t$; $\Delta d_d(s_t,s_t')$ is a change value of image definition of the next state $s_t'$ relative to image definition of the current state $s_t$; $\Delta d_e(s_t,s_t')$ is a change value of edge definition of the next state $s_t'$ relative to edge definition of the current state $s_t$; $\Delta f(a_t)$ is a change value of the current action relative to the camera focal length; and $\omega_1$, $\omega_2$, $\omega_3$, and $\omega_4$ are parameter weights.

Optionally, the automatically selecting a focusing target area from the target image by using a computer vision technology specifically includes:

preprocessing the target image by using a grayscale transformation algorithm and a neighborhood average algorithm, to obtain a preprocessed target image; and automatically selecting the focusing target area from the preprocessed target image by using the computer vision technology.

Optionally, the using sample data in the experience pool as training data of the DNN architecture when there are M sets of the sample data in the experience pool, and obtaining a trained AF policy with reference to a DDPG algorithm and a single HCO algorithm specifically includes:

when when there are M sets of the sample data in the experience pool, selecting n sets of sample data from the experience pool as the training data of the DNN architecture by using a prioritized experience replay (PER) method, and obtaining the trained AF policy with reference to the DDPG algorithm and the single HCO algorithm, where n is less than M.

Optionally, the DNN architecture includes a first network architecture and a second network architecture: the first network architecture includes a policy network and a target policy network: the second network architecture includes a value network and a target value network; input of the policy network is image definition and a camera focal length, and output of the policy network is a focusing current value; and input of the value network is image definition, a camera focal length, and a focusing current value, and output of the value network is an evaluation value; and a parameter of the policy network is updated by using the value network, a parameter of the value network is updated by using the target policy network and the target value network, and parameters of the target policy network and the target value network are updated by using an exponential moving average (EMA) algorithm.

According to a second aspect, the present disclosure provides an AF system for an EH lens with an adjustable focus, including:

a module for determining a state space, an action space, and a reward function, configured to determine a state space, an action space, and a reward function of an RL method, where the state space includes at least two parameters, respectively being image definition and a camera focal length: the action space includes one parameter, being a focusing current value of the EH lens with an adjustable focus; and the reward function is a function designed according to an image difference before and after an action;

a module for calculating image definition and a camera focal length, configured to: obtain a target image acquired by an image sensor, automatically select a focusing target area from the target image by using a computer vision technology, and calculate image definition and a camera focal length of the focusing target area;

a module for calculating a state quantity and a composite action, configured to: input a current state into a policy network in a DNN architecture to obtain a current initial action, add noise to the current initial action to obtain a current composite action, and determine a next state according to the current composite action, where the current state refers to image definition and a camera focal length of a current focusing target area: the current initial action refers to a current focusing current value; and the next state refers to image definition and a camera focal length of a next focusing target area;

a sample data determining module, configured to calculate a current reward according to the current state, the next state, the current composite action, and the reward function, and store the current state, the next state, the current composite action, and the current reward as a set of sample data in an experience pool;

a module for determining a trained AF policy, configured to: use sample data in the experience pool as training data of the DNN architecture when there are M sets of the sample data in the experience pool, and obtain a trained AF policy with reference to a DDPG algorithm and a single HCO algorithm; and a focusing module, configured to deploy the trained AF policy to a to-be-focused EH lens with an adjustable focus, so that the to-be-focused EH lens with an adjustable focus is capable of automatically adjusting a focal point in a real-time environment.

According to a third aspect, the present disclosure provides an electronic device, including a memory and a processor. The memory is configured to store a computer program, and the processor runs the computer program to enable the electronic device to perform the AF method for an EH lens with an adjustable focus according to the first aspect.

According to specific embodiments provided in the present disclosure, the present disclosure discloses the following technical effects:

The present disclosure provides the AF method and system for an EH lens with an adjustable focus, and the electronic device. By combining an advanced EH focusing technology and an RL method to continuously control the DDPG algorithm, more intelligent and self-adaptive AF is implemented. In the present disclosure, the focal length and the focal point can be independently adjusted according to an environment change and a target characteristic, to obtain a clearer image with better quality, which has a wide application prospect and can be used in multiple fields such as photography, UAV aerial photography, and medical imaging.

BRIEF DESCRIPTION OF THE DRAWINGS

To describe the technical solutions in embodiments of the present disclosure or in the conventional technology more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

To make the above objective, features, and advantages of the present disclosure more obvious and easy to understand, the following describes the present disclosure in more detail with reference to accompanying drawings and specific implementations.

Embodiment 1

Figure 1:
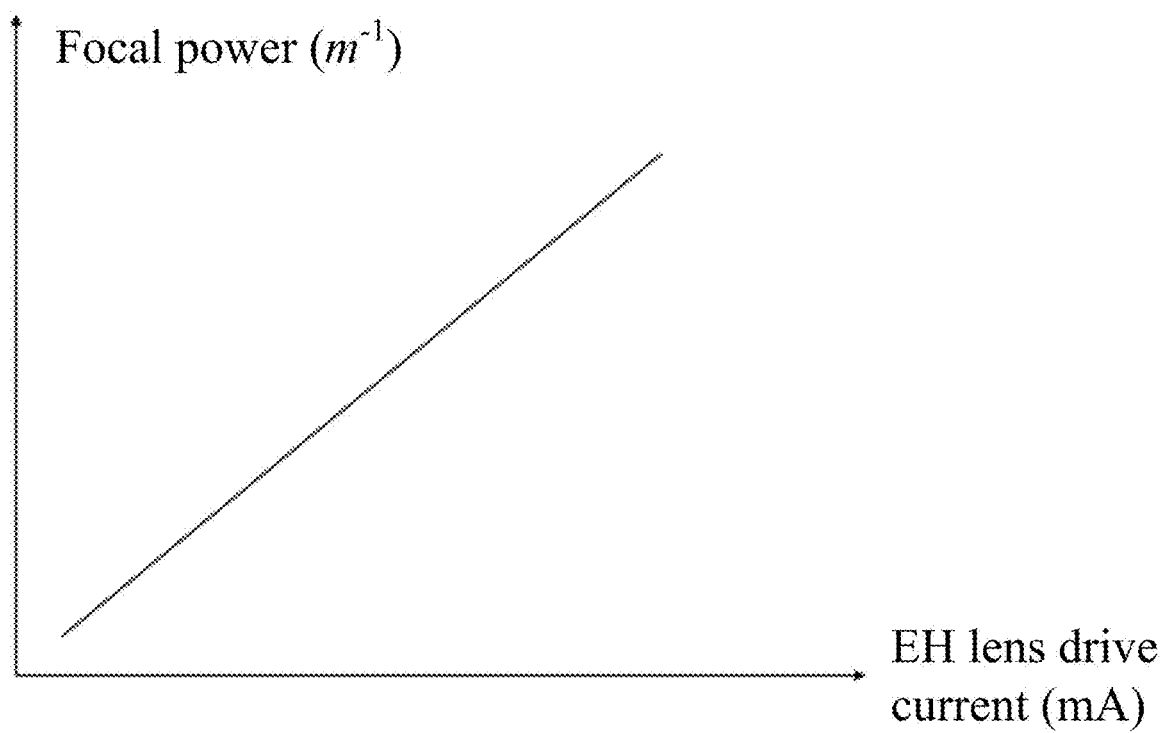
FIG. 1 is a schematic diagram of a relationship between focal power and a drive current of a classical EH lens with an adjustable focus according to the conventional technology.
Figure 2:
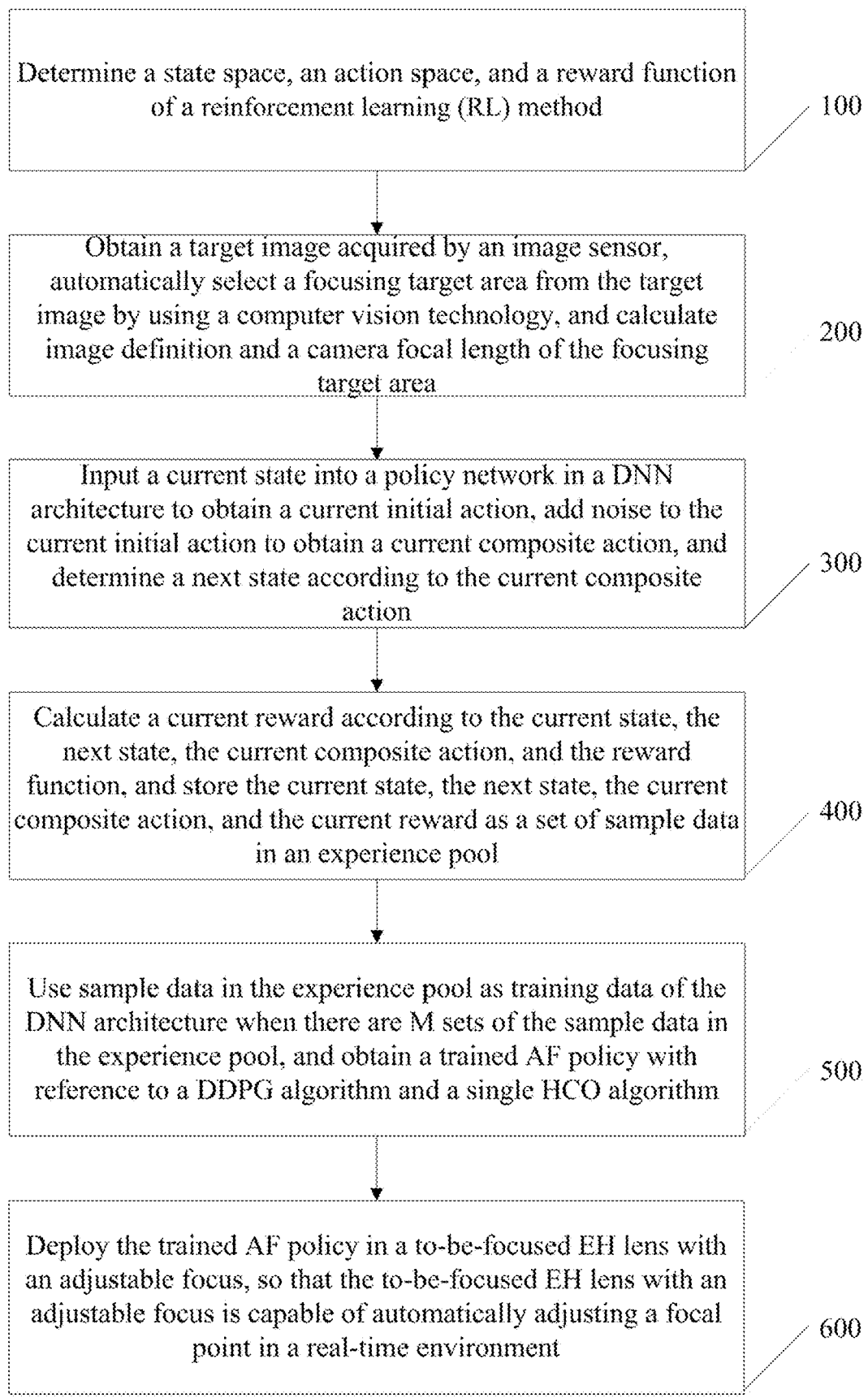
FIG. 2 is a schematic flowchart of an AF method for an EH lens with an adjustable focus according to an embodiment of the present disclosure.

As shown in FIG. 2, this embodiment provides an RL-based AF method for an EH lens with an adjustable focus, including the following steps.

Step 100: Determine a state space, an action space, and a reward function of an RL method, where the state space includes at least two parameters, respectively being image definition and a camera focal length: the action space includes one parameter, being a focusing current value of the EH lens with an adjustable focus; and the reward function is a function designed according to an image difference before and after an action.

Step 200: Obtain a target image acquired by an image sensor, automatically select a focusing target area from the target image by using a computer vision technology, and calculate image definition and a camera focal length of the focusing target area.

Step 300: Input a current state into a policy network in a DNN architecture to obtain a current initial action, add noise to the current initial action to obtain a current composite action, and determine a next state according to the current composite action, where the current state refers to image definition and a camera focal length of a current focusing target area: the current initial action refers to a current focusing current value; and the next state refers to image definition and a camera focal length of a next focusing target area.

Step 400: Calculate a current reward according to the current state, the next state, the current composite action, and the reward function, and store the current state, the next state, the current composite action, and the current reward as a set of sample data in an experience pool.

Step 500: Use sample data in the experience pool as training data of the DNN architecture when there are M sets of the sample data in the experience pool, and obtain a trained AF policy with reference to a DDPG algorithm and a single HCO algorithm.

Step 600: Deploy the trained AF policy to a to-be-focused EH lens with an adjustable focus, so that the to-be-focused EH lens with an adjustable focus is capable of automatically adjusting a focal point in a real-time environment.

In this embodiment, the state space further includes image contrast and edge definition.

Based on this, the reward function designed in this embodiment is:

$$r(s_t, a_t, s_t')_t = \omega_1 \Delta d_c(s_t, s_t') \times (\Delta d_d(s_t, s_t') + \Delta d_e(s_t, s_t')) +$$
$$\omega_2 \Delta d_d(s_t, s_t') + \omega_3 \Delta d_e(s_t, s_t') + \omega_4 \Delta f(a_t) \times (\Delta d_d(s_t, s_t') + \Delta d_e(s_t, s_t')),$$

where $r_t$ is a reward value: $\Delta d_c(s_t, s_t')$ is a change value of image contrast of a next state $s_t'$ relative to image contrast of a current state $s_t$: $\Delta d_d(s_t, s_t')$ is a change value of image definition of the next state $s_t'$ relative to image definition of the current state $s_t$: $\Delta d_e(s_t, s_t')$ is a change value of edge definition of the next state $s_t'$ relative to edge definition of the current state $s_t$. $\Delta f(a_t)$ is a change value of the current action relative to the camera focal length; and $\omega_1$, $\omega_2$, $\omega_3$, and $\omega_4$ are parameter weights.

In this embodiment, the step of automatically selecting a focusing target area from the target image by using a computer vision technology specifically includes:

first, preprocessing the target image by using a grayscale transformation algorithm and a neighborhood average algorithm, to obtain a preprocessed target image; and then automatically selecting the focusing target area from the preprocessed target image by using the computer vision technology.

In this embodiment, the step of using sample data in the experience pool as training data of the DNN architecture when there are M sets of the sample data in the experience pool, and obtaining a trained AF policy with reference to a DDPG algorithm and a single HCO algorithm specifically includes:

when there are M sets of the sample data in the experience pool, selecting n sets of sample data from the experience pool as the training data of the DNN architecture by using a PER method, and obtaining the trained AF policy with reference to the DDPG algorithm and the single HCO algorithm, where n is less than M.

In this embodiment, the DNN architecture includes a first network architecture and a second network architecture: the first network architecture includes a policy network and a target policy network: the second network architecture includes a value network and a target value network: input of the policy network is image definition and a camera focal length, and output of the policy network is a focusing current value; and input of the value network is image definition, a camera focal length, and a focusing current value, and output of the value network is an evaluation value; and a parameter of the policy network is updated by using the value network, a parameter of the value network is updated by using the target policy network and the target value network, and parameters of the target policy network and the target value network are updated by using an EMA algorithm.

Embodiment 2

To resolve a problem in the conventional technology, this embodiment provides an RL-based AF method for an EH lens with an adjustable focus. Image definition is used as an evaluation indicator and a state, and RL and a single HCO are used to quickly, accurately, and efficiently implement an AF function of an EH lens with an adjustable focus, which provides an important basis for subsequent dynamic target capture and tracing.

The RL-based AF method for an EH lens with an adjustable focus provided in this embodiment includes the following steps.

S1: Set an action space and a state space: set the action space and the state space according to a focal length adjustment manner of the EH lens with an adjustable focus and acquired image information.

S1.1: The state space $s_{dim}$ of AF for the EH lens with an adjustable focus includes two parameters, respectively being image definition $E_{EOG}$ and a camera focal length $f(a_t)$, and $$s_{dim} = [E_{EOG}, f(a_t)].$$

In this embodiment, an energy of gradient (EOG) function is used as an evaluation indicator of the image definition. The function has a high sensitivity to a defocus degree of an image, and a function curve of the function has an obvious single-peak characteristic, and the curve has a high symmetry. An expression of the function is as follows:

$$E_{EOG} = \sum_{Hight}\sum_{Widh}[I(x+1, y) - I(x, y)]^2 + [I(x, y+1) - I(x, y)]^2,$$

where

I(x,y) represents a pixel value of the image at coordinates (x,y).

Figure 4:
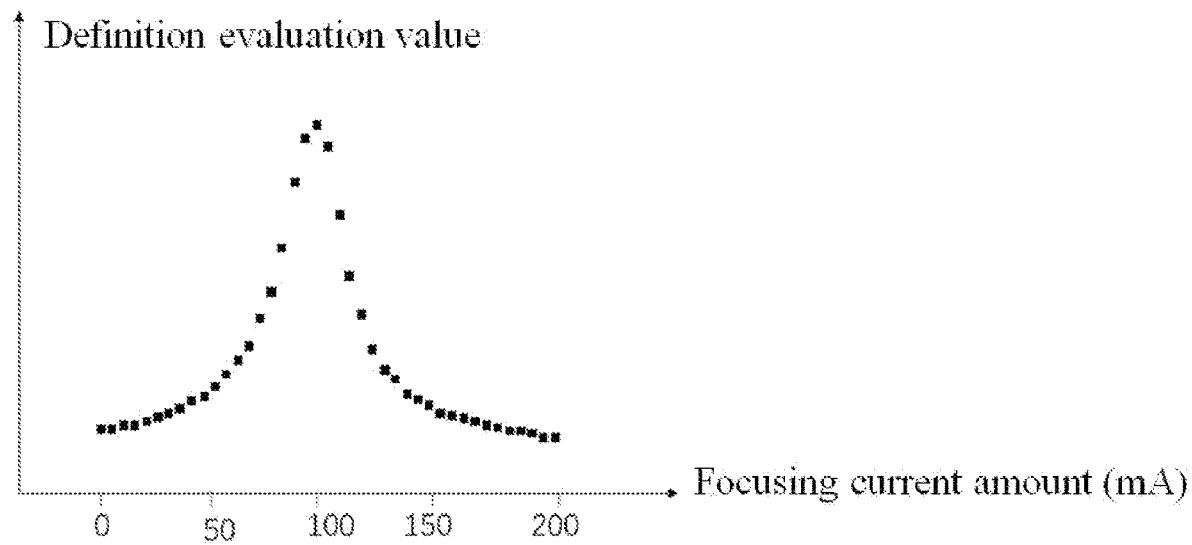
FIG. 4 is a curve graph of an evaluation function of image definition according to an embodiment of the present disclosure.

Imaging definition and a focusing current of a using EH camera are in a Gaussian state. Each current value in a focusing range [0 mA, 200 mA] of the EH lens with an adjustable focus is traversed by using a predetermined step length ΔI=5 mA. A definition evaluation value of a target image at each focusing current value is obtained by using the foregoing expression, as shown in FIG. 4.

S1.2: The action space $a_{dim}$ of AF for the EH lens with an adjustable focus includes one parameter, namely, a focusing current value of the EH lens with an adjustable focus, and $a_{dim}=1$.

S2: Set a reward function: set a target weight of a reward, and set a corresponding reward function based on required focusing control of the EH lens with an adjustable focus, to properly control a focal length according to an actual situation, so as to increase target image definition. The reward function is mainly determined according to a value difference of an image before and after an action is executed. A calculation formula of the reward function is as follows:

$$r(s_t, a_t, s_t')_t = \omega_1 \Delta d_c(s_t, s_t') \times (\Delta d_d(s_t, s_t') + \Delta d_e(s_t, s_t')) +$$

-continued
$$\omega_2 \Delta d_d(s_t, s_t') + \omega_3 \Delta d_e(s_t, s_t') + \omega_4 \Delta f(a_t) \times (\Delta d_d(s_t, s_t') + \Delta d_e(s_t, s_t')),$$

where $r_t$ is a reward value; $\Delta d_c(s_t, s_t')$ is a change value of image contrast of a next state $s_t'$ relative to image contrast of a current state $s_t$; $\Delta d_d(s_t, s_t')$ is a change value of image definition of the next state $s_t'$ relative to image definition of the current state $s_t$; $\Delta d_e(s_t, s_t')$ is a change value of edge definition of the next state $s_t'$ relative to edge definition of the current state $s_t$. $\Delta f(a_t)$ is a change value of a current action relative to the camera focal length; and $\omega_1$, $\omega_2$, $\omega_3$, and $\omega_4$ are parameter weights.

In the reward function, changes of overall definition and edge definition of the image are considered comprehensively. Although there is overlap in some sense, it is mainly considered that in some cases, the image may be clear overall, but edge definition of an object is not high, while in some other cases, the overall definition of the image may be low, but the edge definition of the object is high. By separately measuring the overall definition and the edge definition of the image, different aspects of image quality can be captured more comprehensively. Therefore, a more accurate reward function including the two is designed, to help an RL agent to better adjust the EH lens with an adjustable focus for a better AF effect.

Calculating a product of the image definition as a product factor and a contrast change and a focal length change aims to that: the image definition and the edge definition are good reward signals, that is, are proportional to image quality. However, a contrast change and a focal length change can only reflect large differences of the image before and after a modification. Whether this action is positive or negative can only be determined by using the plus or minus sign of the contrast change and the focal length change. Therefore, after a sum of definition is added as a product, definition is also positively correlated with the image quality.

Figure 5:
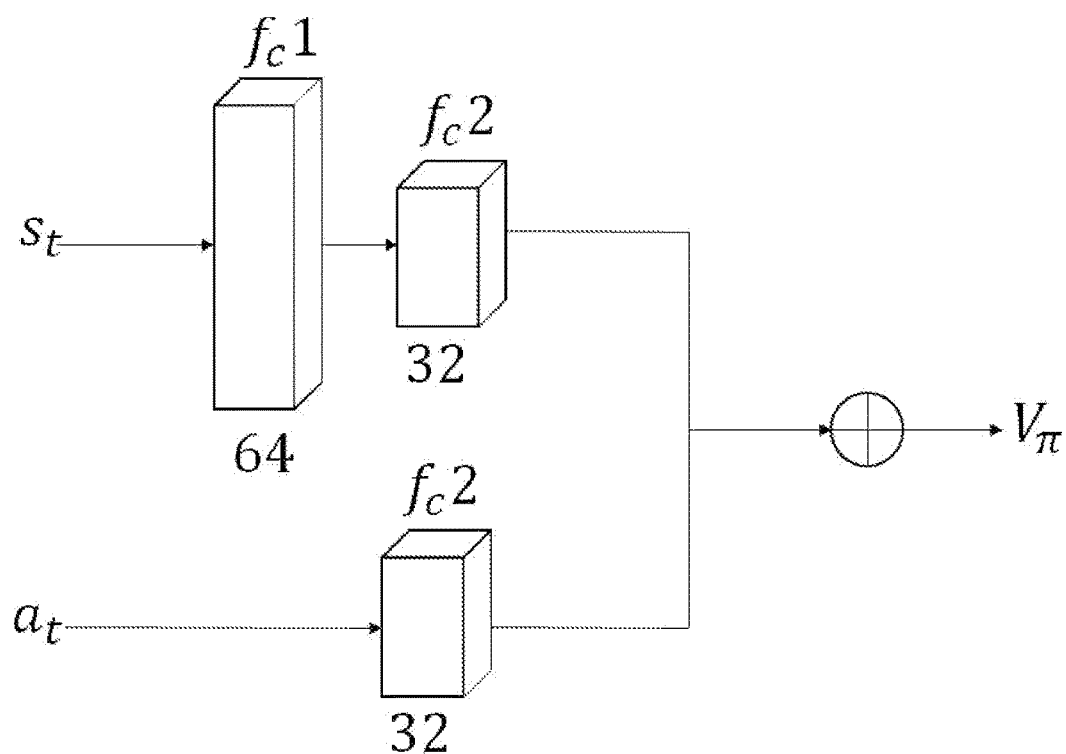
FIG. 5 is a diagram of an Actor network structure according to an embodiment of the present disclosure.
Figure 6:
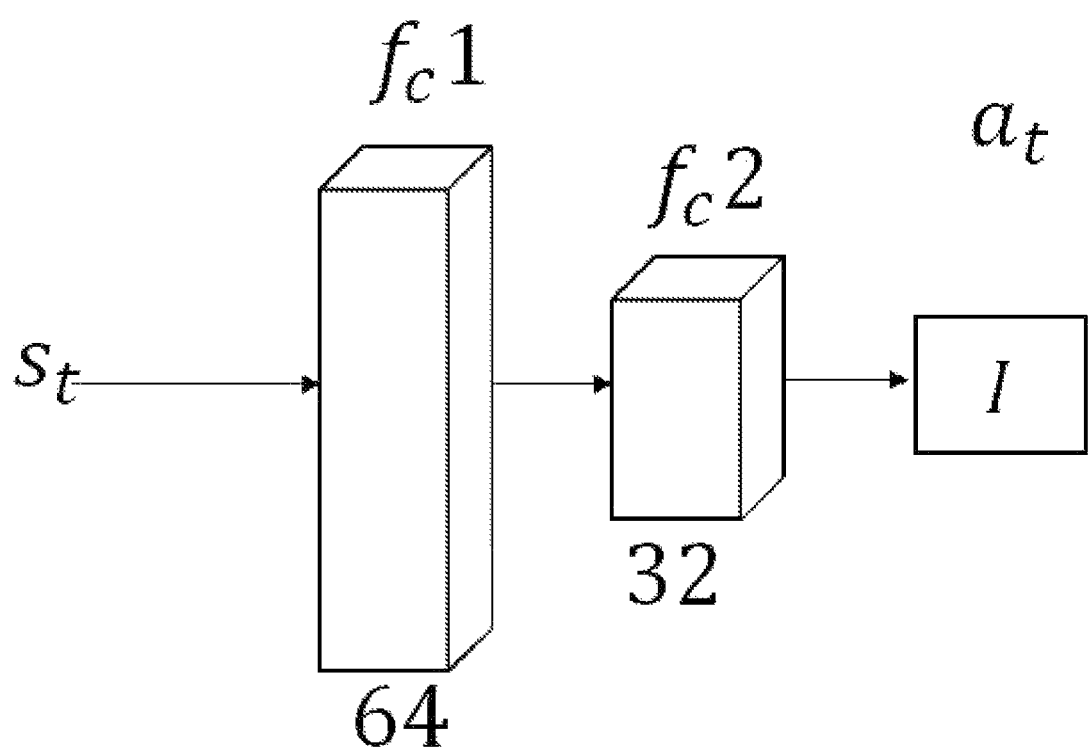
FIG. 6 is a diagram of a Critic network structure according to an embodiment of the present disclosure.

S3: Set a DNN architecture: update a DDPG algorithm based on a conventional Actor-Critic algorithm, and further add two corresponding target networks on a network structure and a policy network structure of a state value function estimator, that is, add a Target Actor network structure and a Target Critic network structure on an Actor network structure and a Critic network structure. Introduction of the target network mainly aims to ensure stability of network learning and prevent over-estimation of a network. Four neural networks are introduced. The Actor network structure and the Target Actor network structure share an architecture, and the Critic network structure and the Target Critic network structure share an architecture. As shown in FIG. 5, the Actor network structure includes four layer structures, and each layer structure includes several nodes. According to that an input layer includes image definition and a focal length, it may be determined that the input layer includes two nodes. A hidden layer includes two layers, a first layer includes 64 nodes, and a second layer includes 32 nodes. An output layer includes one node, namely, a focusing current value. A camera focal length can be changed by changing a current. As shown in FIG. 6, the Critic network structure is relatively complex, including two layers of a state input and an action input. The state input is the same as the Actor network structure, including two nodes and two hidden layers, one layer includes 64 nodes, and the other layer includes 32 nodes. The action input is an output of the Actor network structure, including one node and one hidden layer with 32 nodes. The state input and the 32-node hidden layer of the action input are normalized and activated, for inputting to an output layer. The output layer includes only one node, and a value of the output layer is an evaluation value of the current state and action. When training of the Actor network structure and the Critic network structure reaches a maximum update times or an error is less than a set value, weight update stops. A maximum update times of the Actor network structure is set to 1000, and an error threshold is set to 0.005. A maximum update times of the Critic network structure is set to 500, and an error threshold is set to 0.05.

S4: Set a Noise Parameter.

To ensure that an intelligent agent (the EH lens with an adjustable focus (or may be referred to as an EH lens)) still has an exploration capability under a deterministic policy condition, in a training stage, noise needs to be added to an action obtained by the Actor network structure, to ensure that the agent has the exploration capability. The DDPG algorithm does not only rely on the neural network to participate in decision-making, but adopts a composite action structure. In each step, an action policy first selected by an algorithm network is called a behavior policy, which is represented by $\beta$. However, the policy cannot be simply output as an optimal policy, but should be stored as an experience pool to train and update an action policy u, to obtain the optimal policy. However, in a training process, to ensure exploration, a random noise parameter $N_t$ needs to be added to the optimal policy, and a formula is as follows: $dN_t=\theta(\mu-N_t)dt+\sigma dB_t$.

$\theta$, $\mu$, and $\sigma$ are parameters ($\theta>0$, and $\sigma>0$), and $B_t$ is a standard Brownian motion. When initial perturbation is a single point distribution $a_t$ an origin (that is, it is limited that $N_0=0$), and $\mu=0$, a solution of the foregoing equation is: $N_t=\sigma\int_0^t e^{\theta(\tau-t)}dB_\tau$.

Therefore, a formula for calculating a value of an action $a_t$ in training is: $a_t=\mu(s_t|\theta^\mu)+N_t$. It should be noted that if and only if noise is introduced in training, noise does not need to be used when trained data is actually applied.

Figure 3:
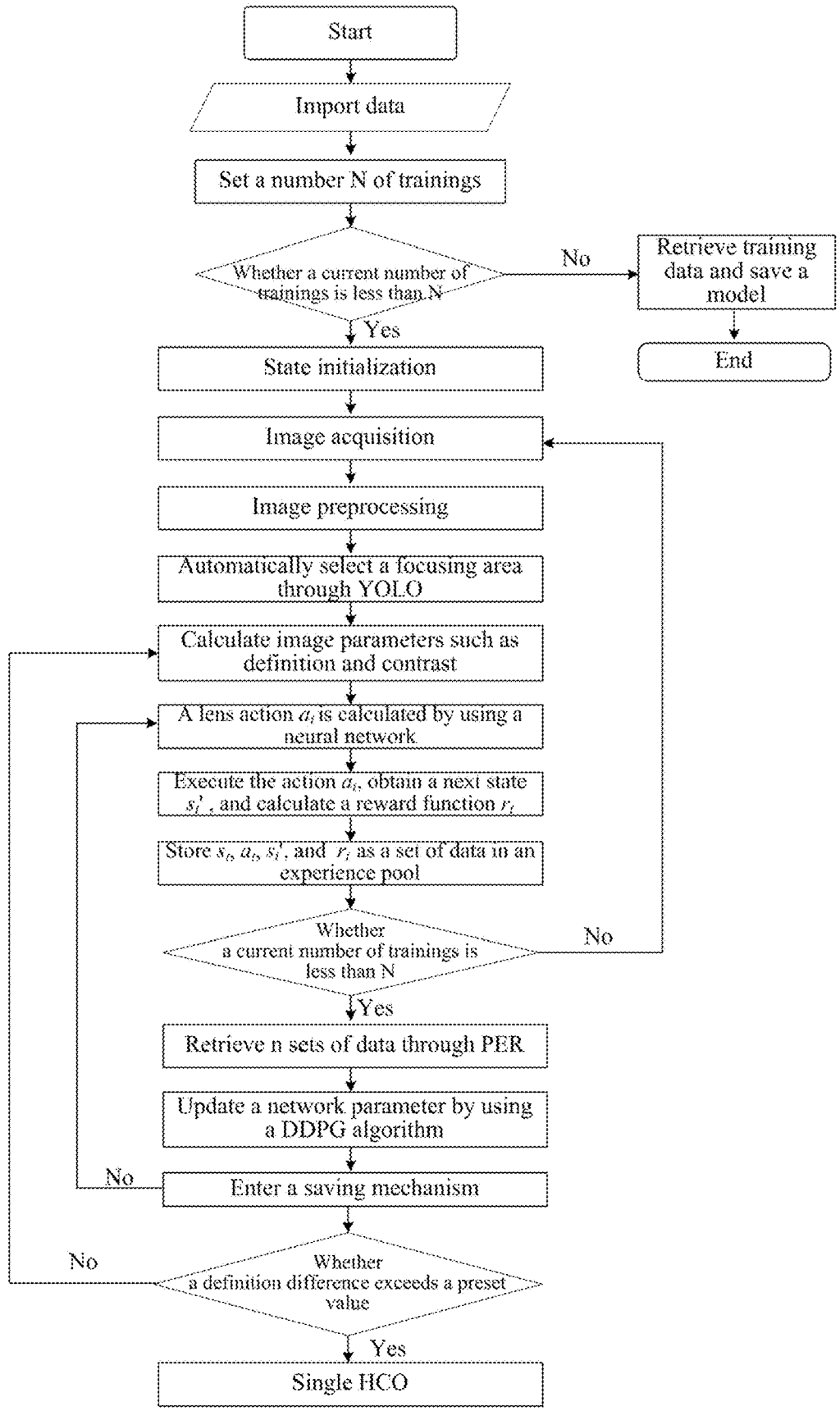
FIG. 3 is an overall flowchart of an AF method for an EH lens with an adjustable focus according to an embodiment of the present disclosure.

S5: Controller training based on the DDPG algorithm:

The DDPG algorithm is used to perform motion control training on a camera tripod head of an unmanned surface vehicle (USV). A total training period is set to N, and n sets of data are retrieved in M times of training to update a network. A main procedure is as follows, and reference may be made to FIG. 3.

Figure 7:
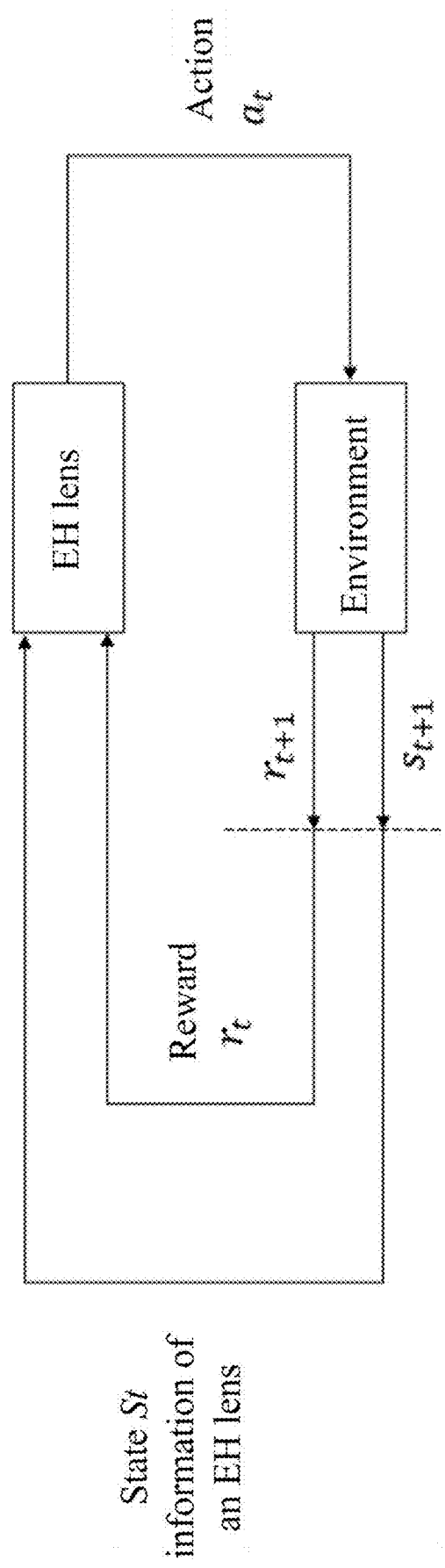
FIG. 7 is a schematic diagram of a searching process of definition and a focal length according to an embodiment of the present disclosure.
Figure 8:
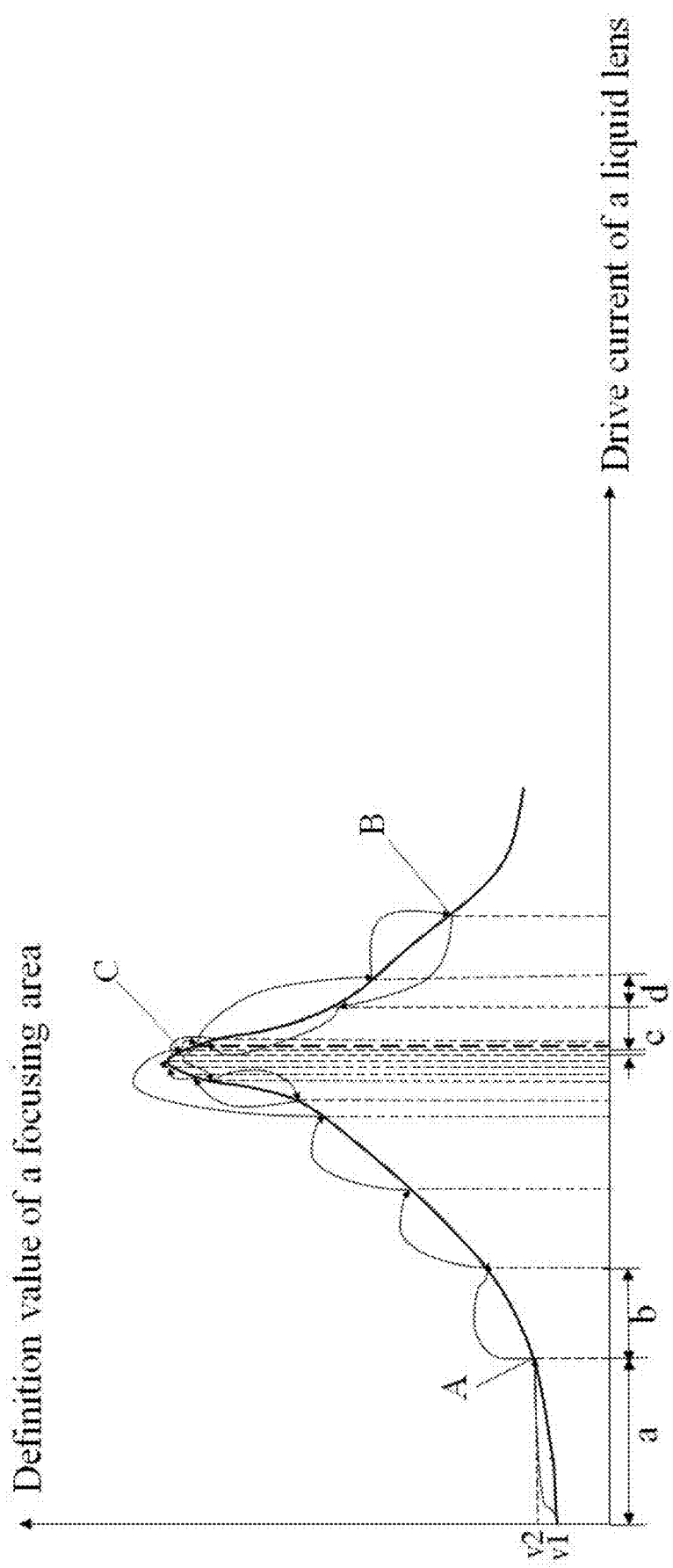
FIG. 8 is a schematic diagram of a relationship between a current value and a definition value of an EH lens with an adjustable focus according to an embodiment of the present disclosure.

(1) State initialization.
(2) Image acquisition.
(3) Image preprocessing.
(4) Automatically select a focusing area through You Only Look Once (YOLO).
(5) Calculate image contrast, edge definition, image definition, and a focal length.
(6) Input the focal length and the image definition as a state $s_t$ to the neural network to calculate a lens action $a_t$ (a current value).
(7) Execute the action $a_t$, obtain the next state $s_t'$, and calculate a reward function $r_t$.
(8) Store the state $s_t$, the action $a_t$, and the next state $s_t'$, and $r_t$ as a set of data in the experience pool.
(9) Determine whether running is performed M times; and if yes, perform step (10), or if no, return to step (2). A process is shown in FIG. 7.
(10) Use a PER method to retrieve n sets of most relevant data, and use the DDPG algorithm to perform parameter iteration on the policy network structure.
(11) Determine whether a definition difference exceeds a preset value; and if yes, return to step (5), or if not, perform step (12).
(12) Use a single HCO to find a clearest image, and complete this round of focusing.
(13) Repeat steps (1) to (12) until the set total training period N is completed, observe a focusing effect of the EH lens with an adjustable focus, and store a learning step length, an observation space, an action space, a training policy, and trained neural network data as actual invoking data of the EH lens with an adjustable focus. A result is shown in FIG. 8.

For image preprocessing in step (3), the following methods are mainly used to remove noise and a light condition in an environment, improving image quality and facilitating subsequent focusing processing.

1. To eliminate influence of light, a grayscale transformation method is used. Because an imaging effect of the image sensor may reduce when light is relatively dark or relatively light, it is necessary to adjust a gray value of an image to improve contrast of the image. It is assumed that a grayscale range of a raw image is [a, b], it is expected that a transformed image has a dynamic range [c, d], and therefore, the following formula may be used to implement this transformation:

$$h(x, y) = \frac{(d-c)[f(x, y)-a]}{b-a} + c$$

In the formula, a and b may be obtained from the raw image, and c and d are adjusted to ensure that a processed image has proper brightness. In this embodiment, a value of c is equal to a, and d=255.

2. A neighborhood average method is used to eliminate the noise. Because there is a large local correlation in pixel distribution in an image, significant correlation exists between adjacent pixels. The noise is superposed on the image in an independent manner, and an average value of the noise is 0. An original gray value may be represented by calculating an average value of gray values of pixels in a pixel neighborhood, to implement image smoothing and noise removal. To avoid obvious blurring while eliminating the noise, an average method with a threshold is used. This method ensures that no visually visible blurring effect occurs on the image.

$$g(x, y) = \begin{cases} \frac{1}{c}\sum_{(m,n)\in S} f(m, n) & \left|f(x, y) - \frac{1}{c}\sum_{(m,n)\in S} f(m, n)\right| > T \\ f(x, y) & \text{others} \end{cases}$$

In an image, a gray value of a pixel g(x,y) represents a result of smoothing processing performed on the pixel, and smoothing is calculated based on a gray value of another coordinate point in a point neighborhood S. In this formula, S represents a set of coordinate points in a point neighborhood, but does not include a point (x,y) itself. c represents a total quantity of coordinate points in the set, and T is a non-negative predetermined threshold. The equation means that when a difference between average gray values of some points and a point in a neighborhood of the some points does not exceed the predetermined threshold T, a gray value of the point remains unchanged. If the threshold T is exceeded, the average gray value of the some points is used to replace the gray value of the point. After this smoothing processing, impulse noise and partial additive noise can be filtered out, significantly improving a signal-to-noise ratio (SNR) of the image. To avoid an obvious visual blurring effect while eliminating the noise, S and T need to be carefully set. In this application instance, S in an 8×8 size is selected, c is 64 correspondingly, and T is set to 15, to eliminate the noise and keep the image clear of obvious visual blurring.

For the single HCO in step (12), a specific implementation method is as follows:

(A) calculating, according to a definition formula, a definition evaluation value $E_0$ of a current superior image corrected through RL;

(B) performing, in a focusing current step length ΔI=2 mA, focusing in a direction in which the definition evaluation value increases;

(C) calculating a definition evaluation value $E_1$ of a target image in a current frame; and (D) comparing a value of $E_0$ with that of $E_1$. If $E_0 \leq E_1$, step (A) is returned. If $E_0 > E_1$, a focusing current value I corresponding to $E_0$ is a result of the single HCO, and a control current of the EH lens with an adjustable focus is changed to I.

The DDPG algorithm includes four parts, respectively being policy network (Actor) update, value network (Critic) update, update of two target (Target) networks, and experience replay.

1. Policy Network (Actor) Update:

First, an action in the state $s_t$ is calculated by using the Actor network:

$$a_t = \mu(s_t \mid \theta^\mu)$$

Then, an evaluation value (that is, cumulative expected return) of a state action pair $(s_t, a_t)$ is calculated by using the Critic network:

$$q_t = Q(s_t, a_t \mid \theta^Q)$$

Finally, a gradient ascent (GA) algorithm is used to maximize the cumulative expected return $q_t$, thereby updating a parameter in the Actor network.

2. Value Network (Critic) Update

An action in the state $s_t'$ is calculated by using the Target Actor network:

$$a_t' = \mu'(s_t' \mid \theta^{\mu'})$$

Then, a target value of a state action pair $(s_t, a_t)$ is calculated by using the Target Critic network:

$$y = r_t + \gamma(1 - done)Q'(s_t', a_t' \mid \theta^{Q'})$$

Finally, a gradient descent (GD) algorithm is used to minimize a difference $L_c$ between an evaluation value and an expected value, thereby updating a parameter in the Critic network:

$$L_c = (y - q)^2$$

3. Update of the Two Target (Target) Networks

For update of the target networks, a soft update manner is used in the DDPG algorithm, which may also be referred to as EMA. That is, a learning rate (or referred to as momentum) τ is introduced, and weighted averaging is performed on an old target network parameter and a corresponding new network parameter, and is assigned to the target networks.

An update process of the Target Actor network:

$$\theta^{\mu'} = \tau\theta^\mu + (1 - \tau)\theta^{\mu'}$$

An update process of the Target Critic network:

$$\theta^{Q'} = \tau\theta^Q + (1 - \tau)\theta^{Q'}$$

The Learning rate (momentum) $\tau \in (0,1)$ is usually 0.005.

4. Experience Replay

PER is used in the basic DDPG algorithm. Compared with a conventional uniform experience replay which randomly selects some data, the PER selects some data with higher priority according to the current state, improving network parameter accuracy. Details are as follows:

$$P(c) = p_c^\alpha / \sum_k p_k^\alpha,$$

where

P(c) represents an experience quadruple $(s_t, a_t, r_t, s_t')$ selected from the experience pool, that is, a data sample: c represents a sequence number of the extracted experience quadruple; $p_k$ represents a priority of the extracted experience quadruple; and a represents a preset parameter used to adjust a priority sampling degree of the data sample.

Compared with the conventional technology, the present disclosure has the following advantages and beneficial effects.

1. In the present disclosure, the RL algorithm is used, which has a high self-learning capability. Therefore, no sample data is needed, and efficient automatic control can be implemented after repeated training for multiple times.

2. The present disclosure mainly focuses on focusing control of the EH lens with an adjustable focus, and can be widely used in various scenarios after automatic control is implemented through RL.

3. In the present disclosure, by combining RL and the single HCO, a current of the EH lens with an adjustable focus can be quickly and efficiently controlled to reach a focal length for a clearest image.

4. In the present disclosure, the PER algorithm is added based on the DDPG algorithm, and experience data is efficiently used for updating, improving precision and efficiency of network learning.

Embodiment 3

To perform the method corresponding to Embodiment 1, to implement corresponding functions and technical effects, the following provides an AF system for an EH lens with an adjustable focus.

The present disclosure provides the AF system for an EH lens with an adjustable focus, including:

a module for determining a state space, an action space, and a reward function, configured to determine a state space, an action space, and a reward function of an RL method, where the state space includes at least two parameters, respectively being image definition and a camera focal length; the action space includes one parameter, being a focusing current value of the EH lens with an adjustable focus; and the reward function is a function designed according to an image difference before and after an action;

a module for calculating image definition and a camera focal length, configured to: obtain a target image acquired by an image sensor, automatically select a focusing target area from the target image by using a computer vision technology, and calculate image definition and a camera focal length of the focusing target area;

a module for calculating a state quantity and a composite action, configured to: input a current state into a policy network in a DNN architecture to obtain a current initial action, add noise to the current initial action to obtain a current composite action, and determine a next state according to the current composite action, where the current state refers to image definition and a camera focal length of a current focusing target area: the current initial action refers to a current focusing current value; and the next state refers to image definition and a camera focal length of a next focusing target area;

a sample data determining module, configured to calculate a current reward according to the current state, the next state, the current composite action, and the reward function, and store the current state, the next state, the current composite action, and the current reward as a set of sample data in an experience pool;

a module for determining a trained AF policy, configured to: use sample data in the experience pool as training data of the DNN architecture when there are M sets of the sample data in the experience pool, and obtain a trained AF policy with reference to a DDPG algorithm and a single HCO algorithm; and a focusing module, configured to deploy the trained AF policy to a to-be-focused EH lens with an adjustable focus, so that the to-be-focused EH lens with an adjustable focus is capable of automatically adjusting a focal point in a real-time environment.

Embodiment 4

An embodiment of the present disclosure provides an electronic device, including a memory and a processor. The memory is configured to store a computer program, and the processor runs the computer program to enable the electronic device to perform the AF method for an EH lens with an adjustable focus according to Embodiment 1.

Alternatively, the foregoing electronic device may be a server.

In addition, this embodiment of the present disclosure further provides a computer-readable storage medium. The computer-readable storage medium stores a computer program, and the computer program is executed by the processor to perform the AF method for an EH lens with an adjustable focus according to Embodiment 1.

The present disclosure relates to the RL-based AF method for an EH lens with an adjustable focus, to implement auto-focusing in different environment conditions, so as to obtain a clear image with high-quality. The method uses the RL algorithm, including the DDPG algorithm, and considers an auto-focusing process as an RL issue. In the present disclosure, the target image is obtained by using the image sensor, and the image is preprocessed to eliminate environmental interference (such as the light and the noise). The focusing target area is automatically selected by using the computer vision technology. Key information in the image is used as a state quantity of RL. A proper action is selected by using a trained neural network, to adjust an electric field of the EH lens with an adjustable focus, so that the EH lens with an adjustable focus performs focusing. The reward function is calculated according to an image quality change after focusing. The DDPG algorithm is used to optimize the neural network. This improves performance of the AF policy. The foregoing steps are repeated and data is saved. The trained AF policy is deployed to an actual EH lens with an adjustable focus, so that the EH lens with an adjustable focus can automatically adjust a focal point in the real-time environment to obtain a clear image. The method of the present disclosure implements, by using an RL technology, intelligent auto-focusing of the EH lens with an adjustable focus, and is applicable to fields such as photographing, a UAV, and medical imaging.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Specific examples are used herein for illustration of principles and implementations of the present disclosure. The descriptions of the above embodiments are merely used for assisting in understanding the method of the present disclosure and its core ideas. In addition, those of ordinary skill in the art can make various modifications in terms of specific implementations and the scope of application in accordance with the ideas of the present disclosure. In conclusion, the content of the specification shall not be construed as limitations to the present disclosure.

What is claimed is:

1. An auto focus (AF) method for an electro-hydraulic (EH) lens with an adjustable focus, comprising:

determining a state space, an action space, and a reward function of a reinforcement learning (RL) method, wherein the state space comprises at least two parameters, respectively being image definition and a camera focal length; the action space comprises one parameter, being a focusing current value of the EH lens with an adjustable focus; and the reward function is a function designed according to an image difference before and after an action;

obtaining a target image acquired by an image sensor, automatically selecting a focusing target area from the target image by using a computer vision technology, and calculating image definition and a camera focal length of the focusing target area;

inputting a current state into a policy network in a deep neural network (DNN) architecture to obtain a current initial action, adding noise to the current initial action to obtain a current composite action, and determining a next state according to the current composite action, wherein the current state refers to image definition and a camera focal length of a current focusing target area; the current initial action refers to a current focusing current value; and the next state refers to image definition and a camera focal length of a next focusing target area;

calculating a current reward according to the current state, the next state, the current composite action, and the reward function, and storing the current state, the next state, the current composite action, and the current reward as a set of sample data in an experience pool;

using sample data in the experience pool as training data of the DNN architecture when there are M sets of the sample data in the experience pool, and obtaining a trained AF policy with reference to a deep deterministic policy gradient (DDPG) algorithm and a single hill climbing optimization (HCO) algorithm; and deploying the trained AF policy to a to-be-focused EH lens with an adjustable focus, so that the to-be-focused EH lens with an adjustable focus is capable of automatically adjusting a focal point in a real-time environment.

2. The AF method for an EH lens with an adjustable focus according to claim 1, wherein the state space further comprises image contrast and edge definition.

3. The AF method for an EH lens with an adjustable focus according to claim 1, wherein the reward function is:

$$r(s_t, a_t, s_t')_t = \omega_1 \Delta d_c(s_t, s_t') \times (\Delta d_d(s_t, s_t') + \Delta d_e(s_t, s_t')) + \omega_2 \Delta d_d(s_t, s_t') + \omega_3 \Delta d_e(s_t, s_t') + \omega_4 \Delta f(a_t) \times (\Delta d_d(s_t, s_t') + \Delta d_e(s_t, s_t')),$$

wherein $r_t$ is a reward value; $\Delta d_c (S_t, S_t')$ is a change value of image contrast of a next state $s_t'$ relative to image contrast of a current state $S_t$; Ada $(S_t, S_t')$ is a change value of image definition of the next state $S_t'$ relative to image definition of the current state $s_t$; $\Delta d_e (S_t, S_t')$ is a change value of edge definition of the next state $S_t'$ relative to edge definition of the current state $s_t$; $\Delta f (a_t)$ is a change value of the current action relative to the camera focal length; and $\omega_1$, $\omega_2$, $\omega_3$, and $\omega_4$ are parameter weights.

4. The AF method for an EH lens with an adjustable focus according to claim 1, wherein the automatically selecting a focusing target area from the target image by using a computer vision technology specifically comprises:

preprocessing the target image by using a grayscale transformation algorithm and a neighborhood average algorithm, to obtain a preprocessed target image; and automatically selecting the focusing target area from the preprocessed target image by using the computer vision technology.

5. The AF method for an EH lens with an adjustable focus according to claim 1, wherein the using sample data in the experience pool as training data of the DNN architecture when there are M sets of the sample data in the experience pool, and obtaining a trained AF policy with reference to a DDPG algorithm and a single HCO algorithm specifically comprises:

when there are M sets of the sample data in the experience pool, selecting n sets of sample data from the experience pool as the training data of the DNN architecture by using a prioritized experience replay (PER) method, and obtaining the trained AF policy with reference to the DDPG algorithm and the single HCO algorithm, wherein n is less than M.

6. The AF method for an EH lens with an adjustable focus according to claim 1, wherein the DNN architecture comprises a first network architecture and a second network architecture; the first network architecture comprises a policy network and a target policy network; the second network architecture comprises a value network and a target value network; input of the policy network is image definition and a camera focal length, and output of the policy network is a focusing current value; and input of the value network is image definition, a camera focal length, and a focusing current value, and output of the value network is an evaluation value; and a parameter of the policy network is updated by using the value network, a parameter of the value network is updated by using the target policy network and the target value network, and parameters of the target policy network and the target value network are updated by using an exponential moving average (EMA) algorithm.

7. An electronic device, comprising a memory and a processor, wherein the memory is configured to store a computer program, and the processor runs the computer program to enable the electronic device to perform the AF method for an EH lens with an adjustable focus according to claim 1.

8. The electronic device according to claim 7, wherein the state space further comprises image contrast and edge definition.

9. The electronic device according to claim 7, wherein the reward function is:

$$r(s_t, a_t, s_t')_t = \omega_1 \Delta d_c(s_t, s_t') \times (\Delta d_d(s_t, s_t') + \Delta d_e(s_t, s_t')) + \omega_2 \Delta d_d(s_t, s_t') + \omega_3 \Delta d_e(s_t, s_t') + \omega_4 \Delta f(a_t) \times (\Delta d_d(s_t, s_t') + \Delta d_e(s_t, s_t')),$$

wherein $r_t$ is a reward value; $\Delta d_c (S_t, S_t')$ is a change value of image contrast of a next state $s_t'$ relative to image contrast of a current state $s_t$; Ada $(S_t, S_t')$ is a change value of image definition of the next state $S_t'$ relative to image definition of the current state $s_t$; $\Delta d_e (S_t, S_t')$ is a change value of edge definition of the next state $S_t'$ relative to edge definition of the current state $s_t$; $\Delta f (a_t)$ is a change value of the current action relative to the camera focal length; and $\omega_1$, $\omega_2$, $\omega_3$, and $\omega_4$ are parameter weights.

10. The electronic device according to claim 7, wherein the automatically selecting a focusing target area from the target image by using a computer vision technology specifically comprises:

preprocessing the target image by using a grayscale transformation algorithm and a neighborhood average algorithm, to obtain a preprocessed target image; and automatically selecting the focusing target area from the preprocessed target image by using the computer vision technology.

11. The electronic device according to claim 7, wherein the using sample data in the experience pool as training data of the DNN architecture when there are M sets of the sample data in the experience pool, and obtaining a trained AF policy with reference to a DDPG algorithm and a single HCO algorithm specifically comprises:

when there are M sets of the sample data in the experience pool, selecting n sets of sample data from the experience pool as the training data of the DNN architecture by using a prioritized experience replay (PER) method, and obtaining the trained AF policy with reference to the DDPG algorithm and the single HCO algorithm, wherein n is less than M.

12. The electronic device according to claim 7, wherein the DNN architecture comprises a first network architecture and a second network architecture; the first network architecture comprises a policy network and a target policy network; the second network architecture comprises a value network and a target value network; input of the policy network is image definition and a camera focal length, and output of the policy network is a focusing current value; and input of the value network is image definition, a camera focal length, and a focusing current value, and output of the value network is an evaluation value; and a parameter of the policy network is updated by using the value network, a parameter of the value network is updated by using the target policy network and the target value network, and parameters of the target policy network and the target value network are updated by using an exponential moving average (EMA) algorithm.

13. An AF system for an EH lens with an adjustable focus, comprising:

a module for determining a state space, an action space, and a reward function, configured to determine a state space, an action space, and a reward function of an RL method, wherein the state space comprises at least two parameters, respectively being image definition and a camera focal length; the action space comprises one parameter, being a focusing current value of the EH lens with an adjustable focus; and the reward function is a function designed according to an image difference before and after an action;

a module for calculating image definition and a camera focal length, configured to: obtain a target image acquired by an image sensor, automatically select a focusing target area from the target image by using a computer vision technology, and calculate image definition and a camera focal length of the focusing target area;

a module for calculating a state quantity and a composite action, configured to: input a current state into a policy network in a DNN architecture to obtain a current initial action, add noise to the current initial action to obtain a current composite action, and determine a next state according to the current composite action, wherein the current state refers to image definition and a camera focal length of a current focusing target area; the current initial action refers to a current focusing current value; and the next state refers to image definition and a camera focal length of a next focusing target area;

a sample data determining module, configured to calculate a current reward according to the current state, the next state, the current composite action, and the reward function, and store the current state, the next state, the current composite action, and the current reward as a set of sample data in an experience pool;

a module for determining a trained AF policy, configured to: use sample data in the experience pool as training data of the DNN architecture when there are M sets of the sample data in the experience pool, and obtain a trained AF policy with reference to a DDPG algorithm and a single HCO algorithm; and a focusing module, configured to deploy the trained AF policy to a to-be-focused EH lens with an adjustable focus, so that the to-be-focused EH lens with an adjustable focus is capable of automatically adjusting a focal point in a real-time environment.

* * * * *